United States Patent
Schillings et al.

(10) Patent No.: US 10,310,726 B2
(45) Date of Patent: Jun. 4, 2019

(54) CONTENT NAVIGATION BASED UPON MOTION

(71) Applicant: Oath Inc., New York, NY (US)

(72) Inventors: Benoit Schillings, Los Altos Hills, CA (US); Jean-Baptiste Maurice Queru, Milpitas, CA (US); Jonathan Paris, Palo Alto, CA (US); Roberto Ortiz, San Jose, CA (US)

(73) Assignee: Oath Inc., New York, NY (US)

( * ) Notice: Subject to any disclaimer, the term of this patent is extended or adjusted under 35 U.S.C. 154(b) by 319 days.

(21) Appl. No.: 14/712,157

(22) Filed: May 14, 2015

(65) Prior Publication Data

US 2016/0334957 A1 Nov. 17, 2016

(51) Int. Cl.
G06F 3/0346 (2013.01)
G06F 3/0482 (2013.01)
G06F 3/0483 (2013.01)
G06F 3/0485 (2013.01)
G06F 3/0486 (2013.01)
G06F 3/0488 (2013.01)

(52) U.S. Cl.
CPC .......... G06F 3/0485 (2013.01); G06F 3/0346 (2013.01); G06F 3/0488 (2013.01); G06F 3/0482 (2013.01); G06F 3/0483 (2013.01); G06F 3/0486 (2013.01); G06F 3/04883 (2013.01)

(58) Field of Classification Search
CPC .... G06F 3/0482; G06F 3/0483; G06F 3/0485; G06F 3/0486; G06F 3/04883
See application file for complete search history.

(56) References Cited

U.S. PATENT DOCUMENTS

| 6,573,883 B1* | 6/2003 | Bartlett | G06F 1/1626 345/156 |
| 6,933,923 B2* | 8/2005 | Feinstein | G06F 1/1626 345/156 |
| 8,381,102 B1* | 2/2013 | Scholler | G06F 1/1694 715/701 |
| 2005/0212751 A1* | 9/2005 | Marvit | G06F 1/1613 345/156 |
| 2006/0017692 A1* | 1/2006 | Wehrenberg | G06F 1/1616 345/156 |
| 2006/0195252 A1* | 8/2006 | Orr | G01C 21/36 701/433 |

(Continued)

Primary Examiner — Eric J. Bycer
(74) Attorney, Agent, or Firm — Cooper Legal Group, LLC

(57) ABSTRACT

Users may interface with user interfaces populated with large sets of data items (e.g., contacts, files, photos, etc.), but may be unable to quickly and/or efficiently find a desired data item. Accordingly, as provided herein, a graphical user interface, populated with a set of data items, may be presented to a user of a client device. Sensor data may be received from a motion sensing component of the client device. The sensor data may indicate a motion of the client device. A motion rate of the motion may be determined. The set of data items may be visually traversed at a scroll rate derived from the motion rate (e.g., a faster motion may increase the scroll rate and a slower motion may decrease the scroll rate). In this way, the user may efficiently scroll through large sets of data items by panning, tilting, twisting, or otherwise moving the client device.

20 Claims, 14 Drawing Sheets

(56) References Cited

U.S. PATENT DOCUMENTS

| | | | |
|---|---|---|---|
| 2007/0176898 A1* | 8/2007 | Suh | G06F 1/1616 345/158 |
| 2009/0088204 A1* | 4/2009 | Culbert | G06F 3/017 455/556.1 |
| 2009/0265627 A1* | 10/2009 | Kim | G06F 1/1626 715/702 |
| 2011/0102455 A1* | 5/2011 | Temple | G06F 3/017 345/619 |
| 2011/0157231 A1* | 6/2011 | Ye | G09G 3/20 345/649 |
| 2012/0036485 A1* | 2/2012 | Watkins, Jr. | G06F 1/1626 715/863 |
| 2013/0176346 A1* | 7/2013 | Chen | G06F 1/1694 345/684 |
| 2013/0212515 A1 | 8/2013 | Eleftheriou | |

* cited by examiner

CONTENT NAVIGATION BASED UPON MOTION

BACKGROUND

Users may interact with applications, websites, and/or other interfaces that expose a relatively large amount of data items (e.g., contacts, music files, news stories, photos, etc.). However, a user may be unable to quickly and/or efficiently find a data item of interest. In an example, Sue may desire to find a music file from within a music file folder stored on her touch device. Scrolling through the music file folder based upon touch input on the touch device may be cumbersome and/or slow. In another example, Sue may desire to find a news article pertaining to a recent plane crash. Sue may attempt to scroll through news articles using one hand while holding a bag in her other hand. Sue may be unable to find the news article she desires amidst multiple news articles, because she lacks the ability to search and/or scroll through the multiple news articles using merely one hand.

SUMMARY

In accordance with the present disclosure, one or more systems and/or methods for content navigation are provided. In an example, a graphical user interface, populated with a set of data items, may be presented to a user of a client device. A touch signal may be received through a touch screen of the client device. The touch signal may correspond to a scroll initiation command. Sensor data may be received from a motion sensing component (e.g., a gyroscope sensor, an accelerometer, a camera, a motion sensor, etc) of the client device. The sensor data may indicate motion of the client device. A motion rate of the motion may be determined based upon sensing motion, a change in velocity, a tilt, and/or other physical position properties of the client device. The set of data items may be traversed at a scroll rate derived from the motion rate. In an example, the set of data items may be traversed responsive to receiving the touch signal corresponding to the scroll initiation command. In an example, the set of data items may be traversed responsive to the motion rate exceeding a threshold. In an example, the set of data items may refrain from being traversed responsive to the rotation rate not exceeding the threshold. The set of data items may be displayed according to a carousel format, a list format, a card format, etc. The set of data items may cease being visually traversed responsive to receiving a termination of the touch signal. In this way, a data item, from the set of data items, that is in focus at a point in time when the touch signal was terminated may be displayed.

Responsive to the motion of the client device occurring according to a first motion (e.g., a circle motion in a clockwise direction, an up/down motion, a tilt motion, a rotation motion, a shaking motion in a left to right motion, etc.), the set of data items may be visually traversed in a first direction. Responsive to the motion of the client device occurring according to a second motion (e.g., a circle motion in a counter-clockwise direction, a down/up motion, a tilt motion, a rotation motion, a shaking motion in a right to left motion, etc.), the set of data items may be visually traversed in a second direction.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
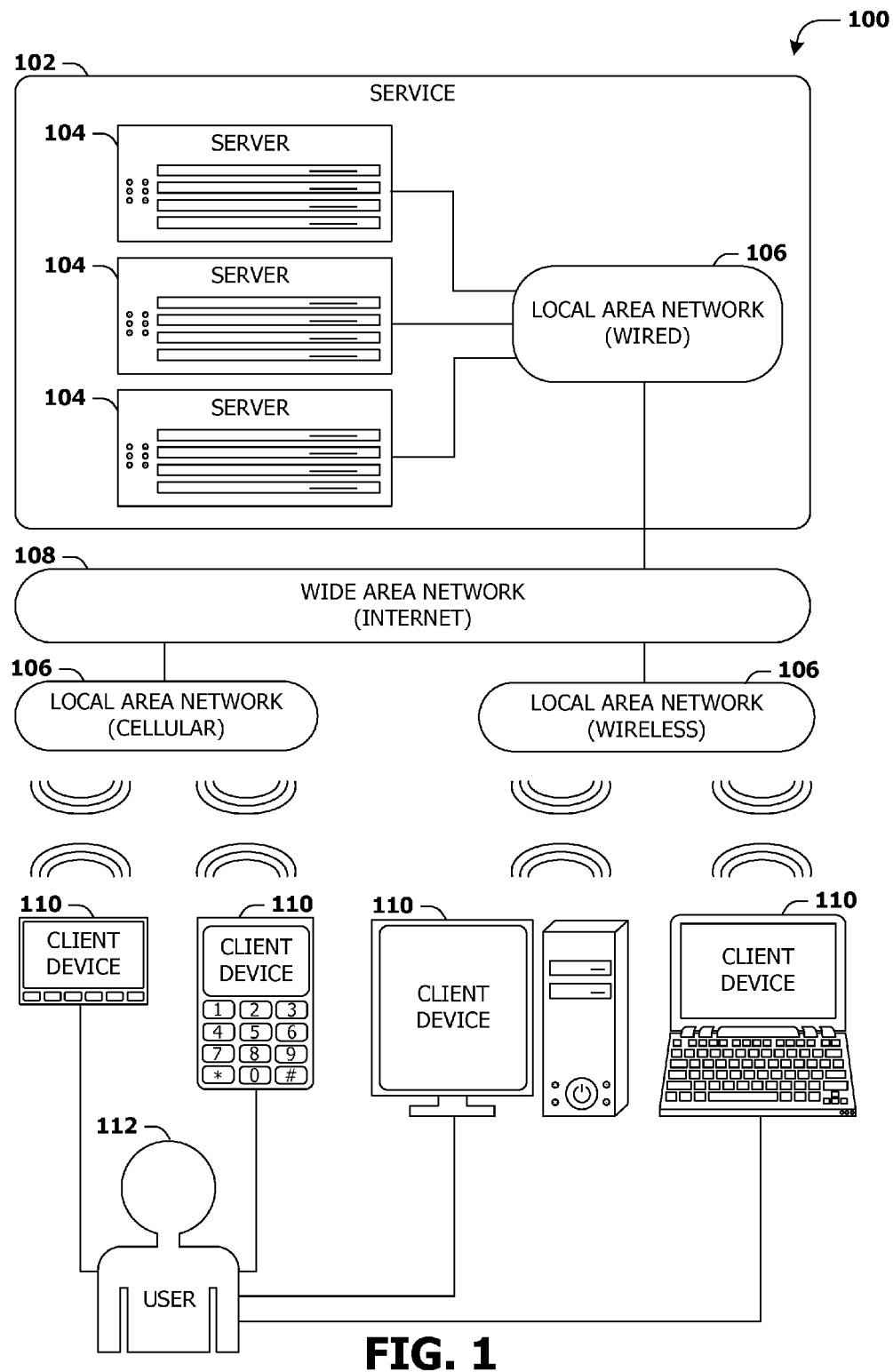
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a BLUETOOTH personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
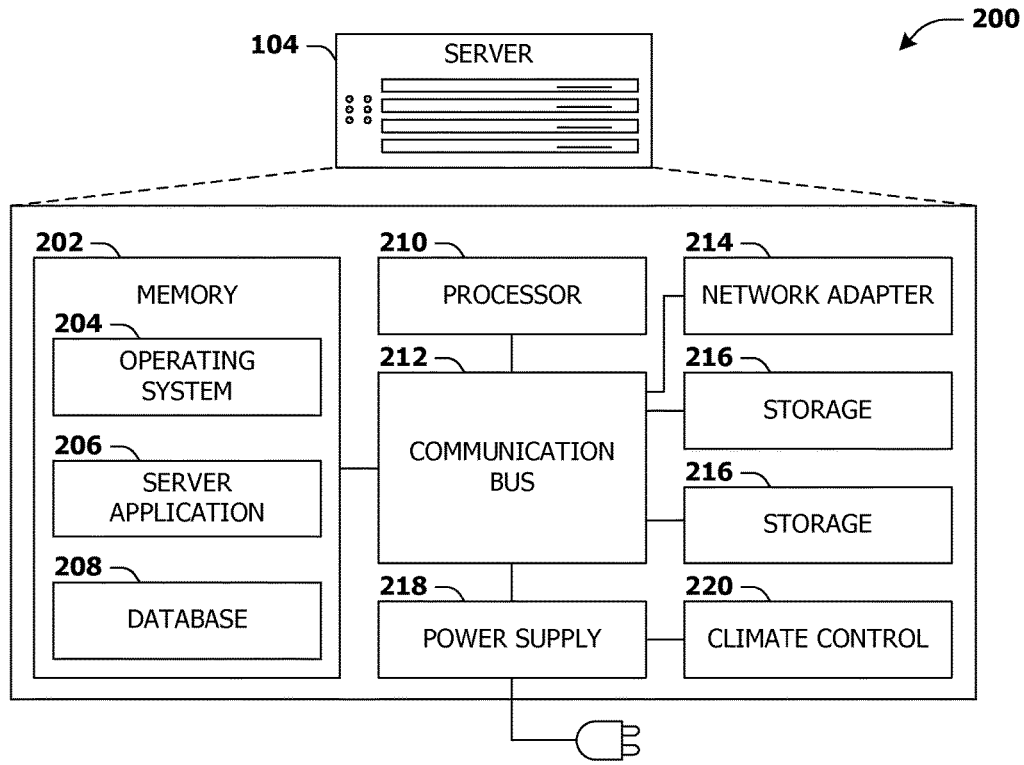
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
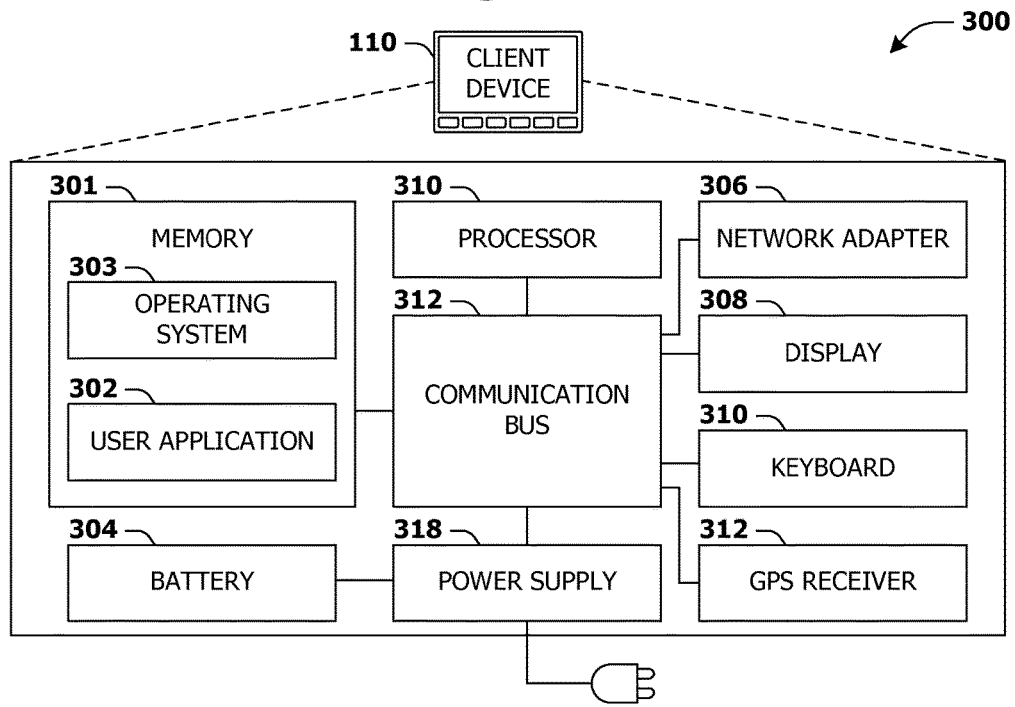
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

Many users may desire an efficient and/or quick way to navigate through large sets of data items. Unfortunately, users may waste time and/or computing resources performing searches and/or slowly scrolling through a set of data items. Additionally, a user may have merely one hand available for holding and interacting with a client device, such as mobile device with a touch screen (e.g., the user may be holding a bag in one hand and a smart phone in another hand, and thus the user may merely have one thumb available for content navigation through a set of data items such as songs to play).

Accordingly, as provided herein, users may efficiently visually traverse sets of data items based upon a motion of the client device, such as rotation, tilting, panning, and/or other physical movement of the client device. For example, the user may desire to find a particular contact (e.g., a phone number, an email address, etc.). A contact management interface, populated with a set of contacts, may be presented to the user, such that the user may visually traverse one or more contacts by moving, such as rotating, the client device. Once the user identifies the particular desired contact, the user may stop moving the client device, and the particular contact may be displayed to the user. Providing users with an ability to efficiently, quickly, and/or precisely traverse the set of data items may reduce time and/or computing resources otherwise utilized by users in an attempt to identify a desired data item. Further, the user may have an improved ability to visually traverse the set of data items utilizing a single hand.

FIGS. 4A-4D illustrate an example of a system 400, comprising a data manipulation component 412, for visually traversing a set of data items utilizing a motion sensing component 413 (e.g., a gyroscope sensor, an accelerometer, a camera, a compass, a motion sensor, and/or any other motion sensing device or combination thereof). A user may be presented with a graphical user interface 404, on a touch screen 407 of a client device 402, that is displaying a first data item in a card format (e.g., a first contact 416 may be displayed on a first card 405, a second contact 426 may be displayed on a second card 415, etc.). In an example, the first data item may comprise the first contact 416 (e.g., a phone number, an email address, and a home address of a user), a first image 414 of the first user, etc. The client device 402 may comprise a first icon 406 (e.g., such as an email icon), a touch icon 408, a second icon 410 (e.g., such as a text message icon), and/or other icons. In an example, the user may interact with, such as touch 408A, the touch icon 408 for a threshold amount of time in order to activate visual traversal through the user's contacts on the graphical user interface 404 using motion of the client device 402. In an example, the user may touch 408A the touch icon 408 for the threshold amount of time in order to send a touch signal to the data manipulation component 412. The touch signal may correspond to a scroll initiation command for the user's contacts.

Figure 4A:
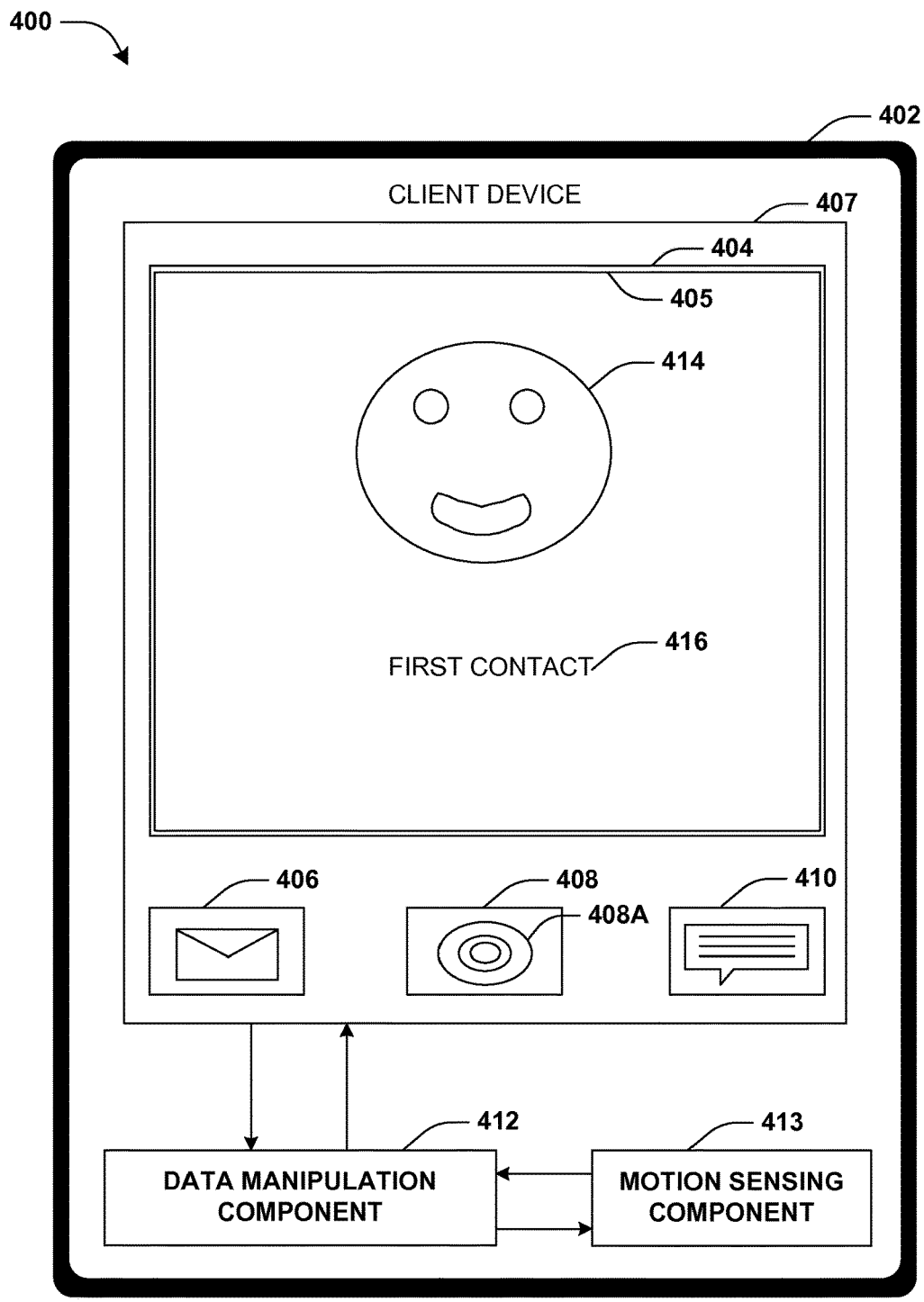
FIG. 4A is a component block diagram illustrating an example system for content navigation, where a set of data items are displayed according to a card format.
Figure 4B:
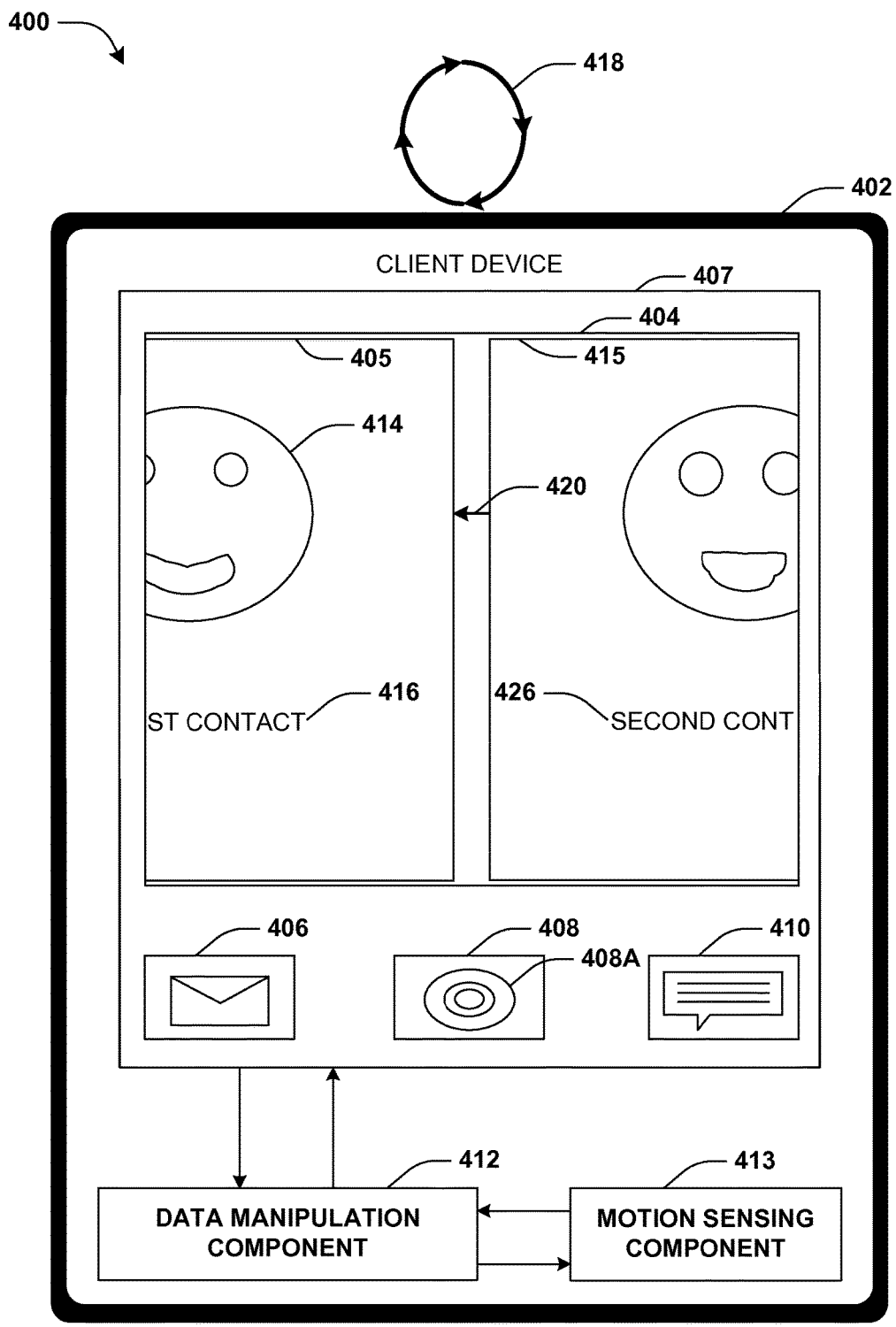
FIG. 4B is a component block diagram illustrating an example system for content navigation, where a rotation of a client device is indicated by a first motion.

FIG. 4B illustrates the user moving the client device 402 in a first motion 418 (e.g., a circular motion, a rotational motion, a tilting motion, an up and down motion, a shaking motion, etc.). The first motion 418 may be detected as sensor data by the motion sensing component 413. In an example, the first motion 418 may comprise a circular motion in a clockwise direction. The data manipulation component 412 may determine a motion rate, such as a rotation rate, of the client device 402. In an example, the motion rate may be determined by using an axis (e.g., such as an X-axis, Y-axis, Z-axis, etc.) of the motion sensing component 413 to determine a direction of the motion of the client device 402 and a motion rate of the client device 402 relative to a plane (e.g., an XY plane, an XZ plane, a YZ plane, etc.). In an example, the motion rate may be determined based upon a distance the client device 402 is moved, a velocity of the client device 402, a change in velocity of the client device 402, a degree of tilt of the client device, and/or any other motion properties of the client device 402. In an example, the user may touch 408A the touch icon 408 and rotate the client device 402 with a single hand, with two hands (e.g., a first hand to touch 408A the touch icon 408 and a second hand to move the client device 402), a stylus, etc.

Responsive to identifying the first motion 418 and the scroll initiation command, the data manipulation component 412 may be configured to visually traverse the set of data items at a scroll rate derived from the motion rate, such as the rotation rate of the client device 402. In an example, the scroll rate of the set of data items may be from 16 milliseconds per data item to 3 seconds per data item, or any other scroll rate, based upon a total number of data items within the set of data items. In an example, if the motion rate is below a threshold (e.g., 1 rotation per 5 seconds), then the set of data items may not be traversed. In an example, if the motion rate is above the threshold, then the set of data items may be traversed at a scroll rate corresponding to the motion rate (e.g., the faster the motion, the faster the data items will be scrolled). In an example, if the sensor data indicates that the user is moving the client device 402 according to the first motion 418, but the user did not initiate the scroll initiation command, then the set of data may not be visually traversed. Responsive to identifying the first motion 418, the set of data items may be visually traversed in a first direction 420 (e.g., from right to left). In an example, the first card 405 may move out of a visible area (e.g., out of focus) of the graphical user interface 404 in the first direction 420 as the second card 415 moves into the visible area (e.g., into focus) in the first direction 420.

In an example, the data manipulation component 412 may correlate the scroll rate of the set of data items to the motion rate by generating a callback responsive to the scroll rate. Responsive to the callback, the motion sensing component 413 may be queried to determine an updated motion rate, such as an updated rotation rate, tilt angle, and/or direction of a current motion of the client device 402, and the updated motion rate may be used to determine an updated scroll rate for traversing through the set of data items (e.g., the scroll rate may be increased as the user increases a tile angle or rotation rate of the client device 402). In an example, the motion sensing component 413 may determine a state of the client device 402 (e.g., if the motion rate, tilt, and/or direction has altered), and may increase, keep constant, and/or decrease the scroll rate responsive to the alteration. In an example, the data manipulation component 412 may receive the callback based upon the motion sensing component 413 detecting an alteration in the motion of the client device 402. Responsive to the motion of the client device 402 altering, the scroll rate may be changed responsive to the alteration, such as based upon the updated motion rate. In an example, a repeating timer may be set (e.g. 100 times per second), and responsive to the timer going off, the data manipulation component 412 may query the state of the client device 402. Responsive to the motion sensing component 413 indicating an alteration in the motion of the client device 402, the data manipulation component 412 may continue to scroll through different data items on the graphical user interface 404 to account for the alteration.

Figure 4C:
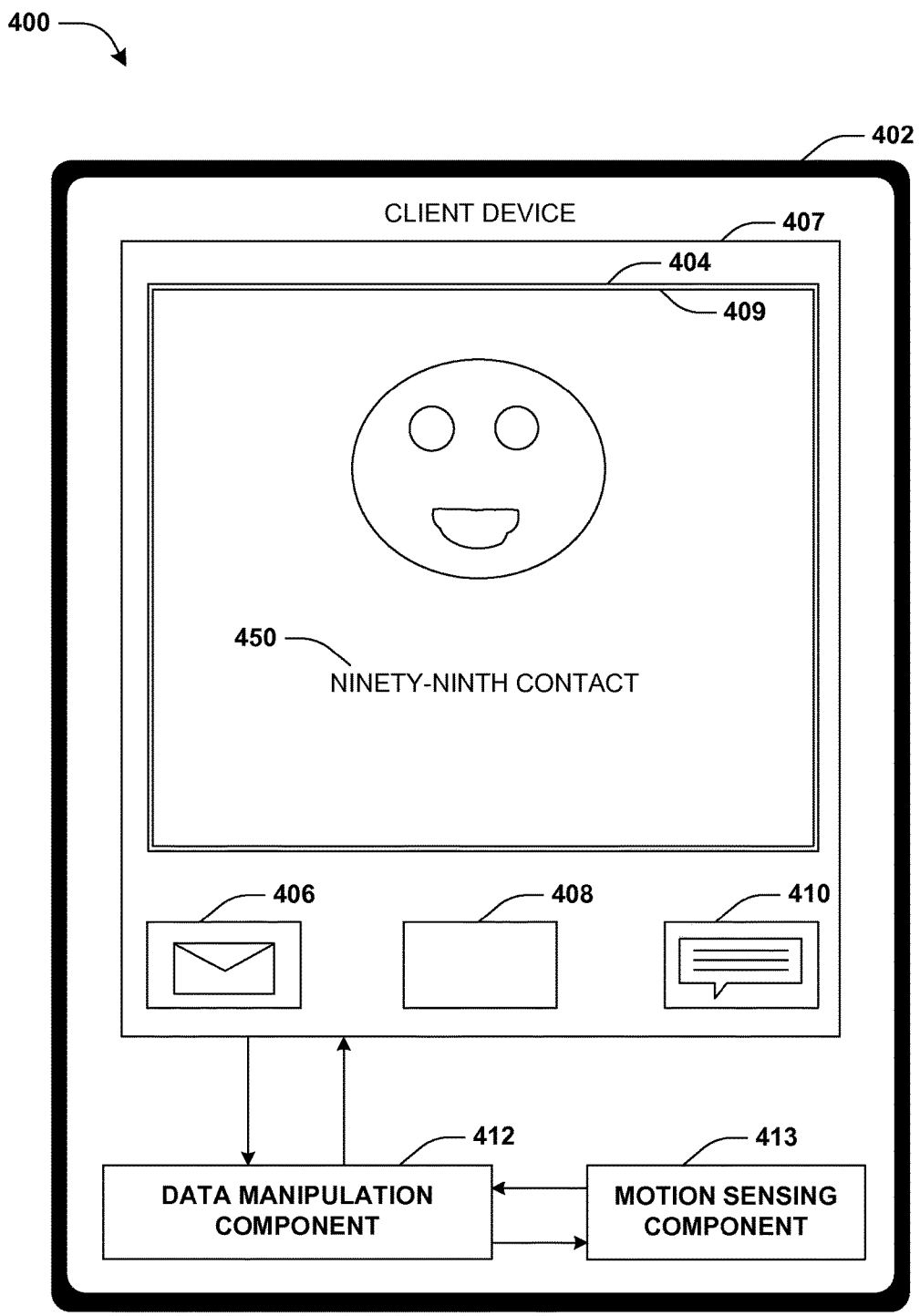
FIG. 4C is a component block diagram illustrating an example system for content navigation, where a termination of a touch signal is received and/or a rotation of a client device is ceased.

FIG. 4C illustrates the user ceasing the motion of the client device 402 and/or terminating the touch signal by ceasing to touch 408A the touch icon 408. In an example, responsive to the user visually identifying a desired contact (e.g., a ninety-ninth contact 450 on a ninety-ninth card 409), the user may terminate the touch signal and/or cease the motion of the client device 402. Responsive to terminating the touch signal and/or ceasing the motion, the set of data items may cease from being visually traversed and the data item (e.g., the ninety-ninth contact 450) in focus a point in time when the touch signal was terminated and/or the motion was ceased may be presented to the user.

Figure 4D:
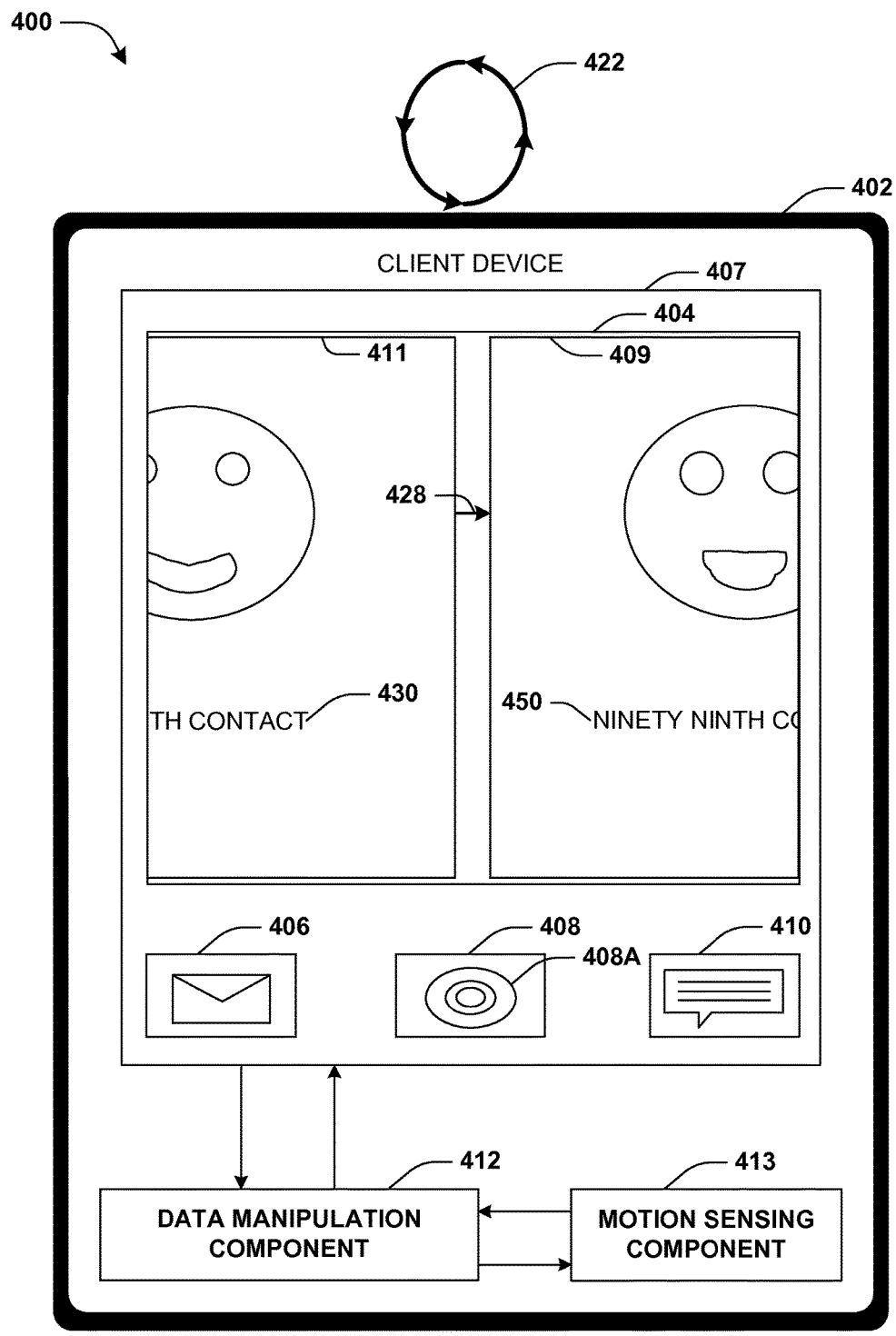
FIG. 4D is a component block diagram illustrating an example system for content navigation, where a rotation of a client device is indicated by a second motion.

FIG. 4D illustrates the user moving, such as rotating, the client device 402 in a second motion 422. In an example, the second motion 422 may comprise a circular motion in a counter-clockwise direction. Responsive to identifying the second motion 422, the set of data items may be visually traversed in a second direction 428 (e.g., from left to right on the page). A ninety-eighth card 411, displaying a ninety eighth contact 430, may move into a visible area (e.g., into focus) of the graphical user interface 404 in the second direction 428 as the ninety-ninth card 409 moves out of the visible area in the second direction 428. In an example, if the user overshoots the desired contact, the user may visually traverse the data items in an opposite order as the data items were initially presented. In this way, the user may navigate through data items by moving the client device 402 for quick traversal through a large number of data items and/or fine grained traversal between data items.

Figure 5A:
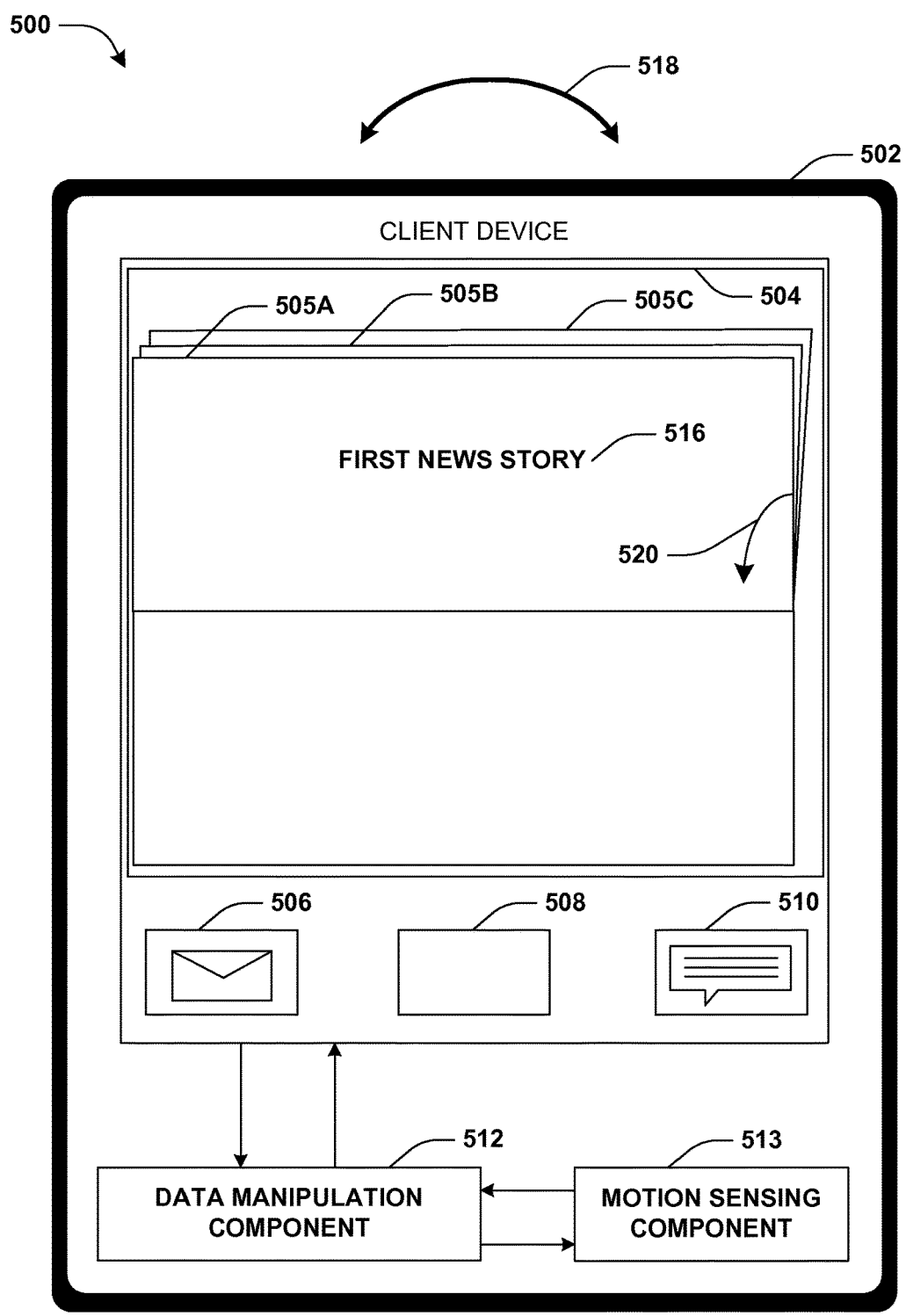
FIG. 5A is a component block diagram illustrating an example system for content navigation, where a set of data items are displayed according to a carousel format.
Figure 5B:
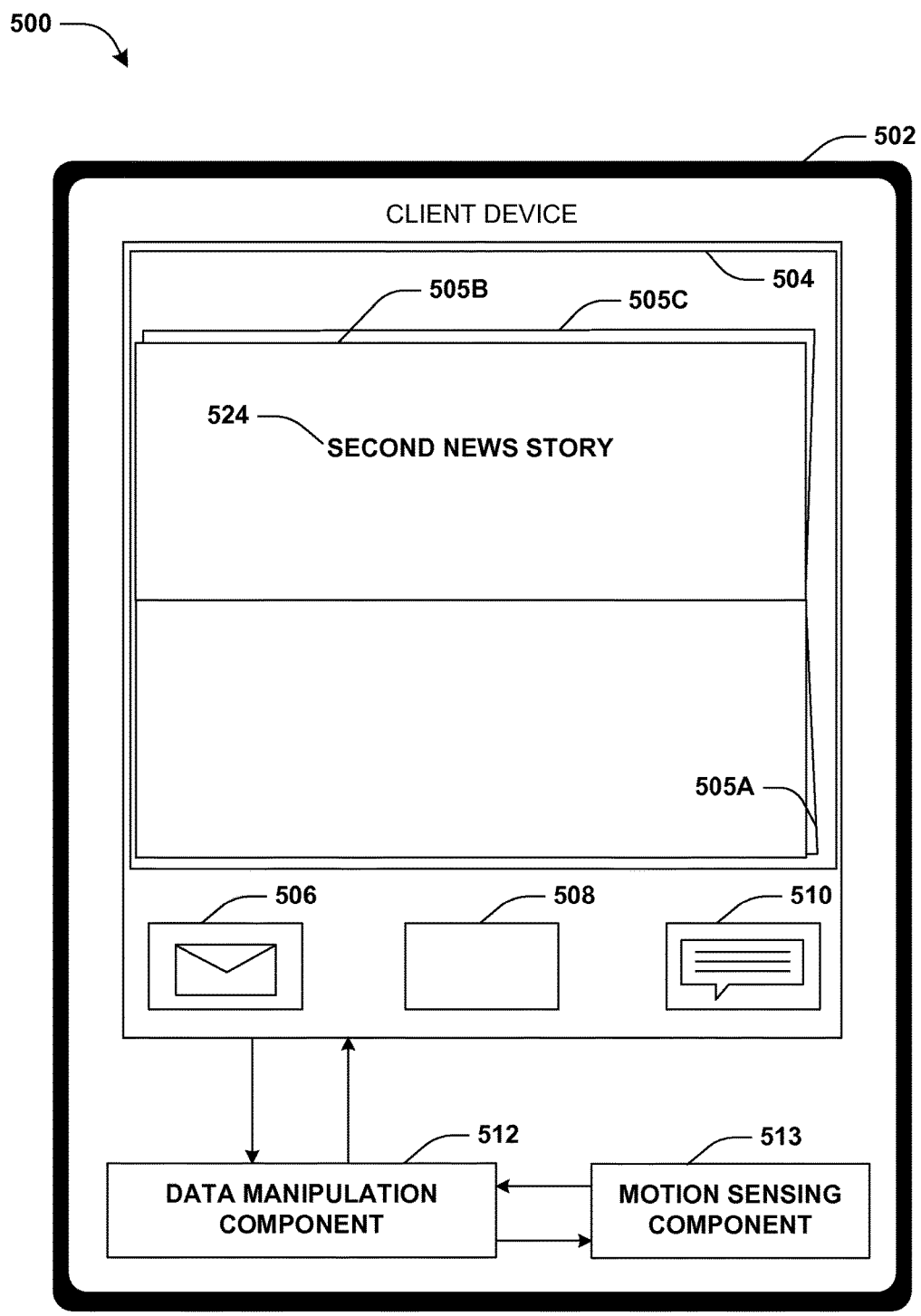
FIG. 5B is a component block diagram illustrating an example system for content navigation, where a rotation of a client device is ceased.

FIGS. 5A-5B illustrate an example of a system 500, comprising a data manipulation component 512, for visually traversing a set of data items utilizing a motion sensing component 513. A user, of a client device 502, may be presented with a graphical user interface 504 displaying a first data item in a carousel or any other display format. In an example, the first data item may comprise a first news story 516. The first news story 516 may be displayed on a first page 505A. A second data item may comprise a second news story 524 displayed on a second page 505B that is partially visible behind the first page 505A. A third data item may comprise a third news story displayed on a third page 505C that is partially visible behind the second page 505B. The client device 502 may comprise a first icon 506, a touch icon 508, a second icon 510, etc. The user may move the client device 502 in a first motion 518, which may be detected as sensor data by the motion sensing component 513. In an example, the first motion 518 may comprise a left to right motion (e.g., such as tilting the client device 502 from left to right, shaking the client device 502 from left to right, or any other motion and/or combination of motions). Responsive to identifying the first motion 518, the first page 505A may flip down in a first direction 520 to reveal the second page 505B (e.g., the first motion 518 may trigger a traversal of the set of data items from the first data item to the second data item), as illustrated in FIG. 5B. If the user continues the first motion 518, then the second page 505B may flip down in the first direction 520 to reveal the third page 505C (e.g., the continued first motion 518 may trigger a traversal of the set of data items from the second data item to the third data item).

FIG. 5B illustrates the user ceasing the motion of the client device 502. In an example, the user may cease the motion of the client device 502 when the user visually identifies a desired news story. Responsive to the user ceasing the motion of the client device 502, the data item in focus at a point in time when the user ceased the motion (e.g., the second data item comprising the second news story 524) may be presented to the user. In an example, a second motion (not shown) may comprise a right to left motion (e.g., a motion opposite to the first motion 518). In an example, if the sensor data indicates that the user is moving the client device 502 in the second motion, then the news stories may be scrolled through in an second direction opposite the first direction (e.g., such as by flipping up from the second page 505B to the first page 505A).

Figure 6A:
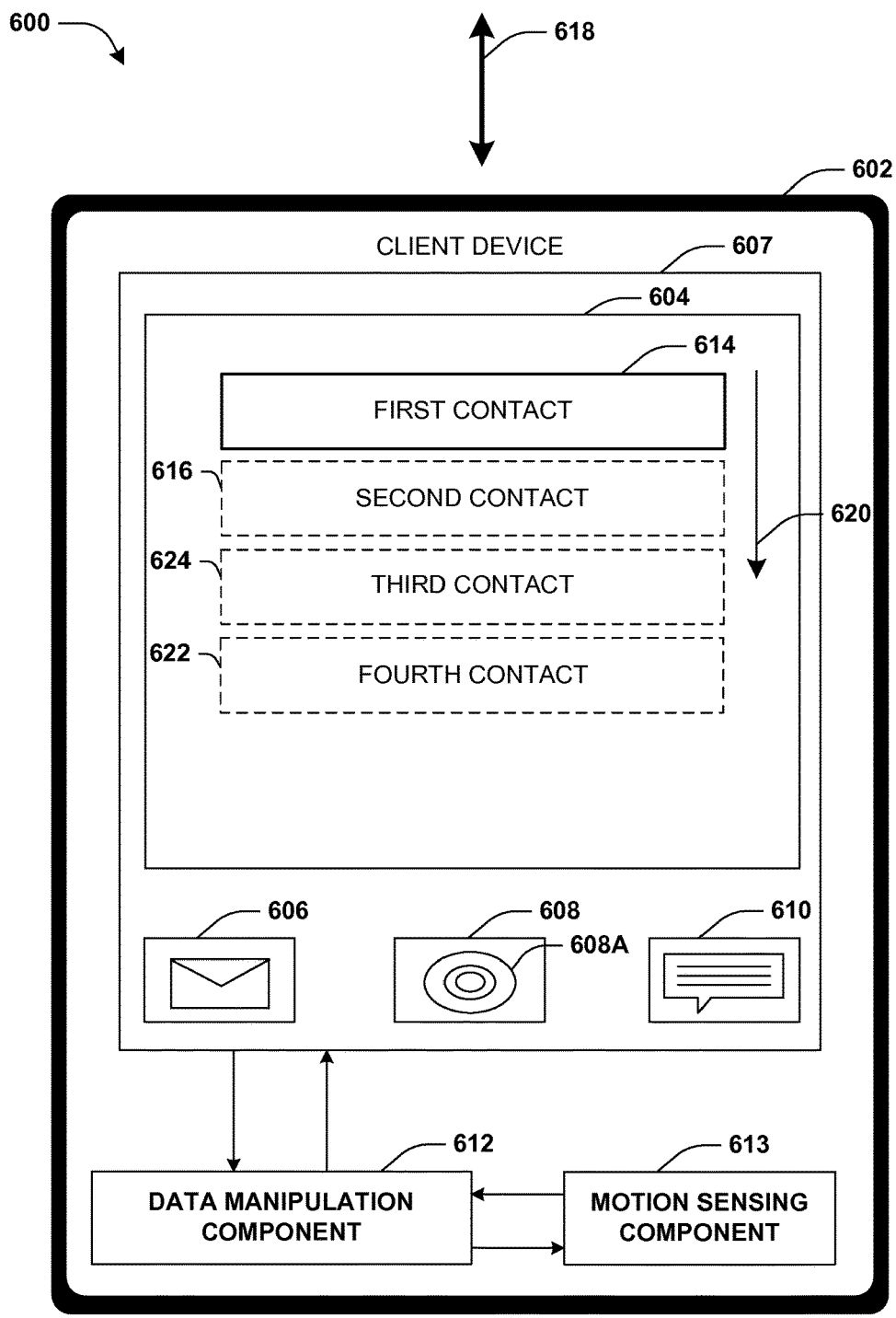
FIG. 6A is a component block diagram illustrating an example system for content navigation, where a set of data items are displayed according to a list format.
Figure 6B:
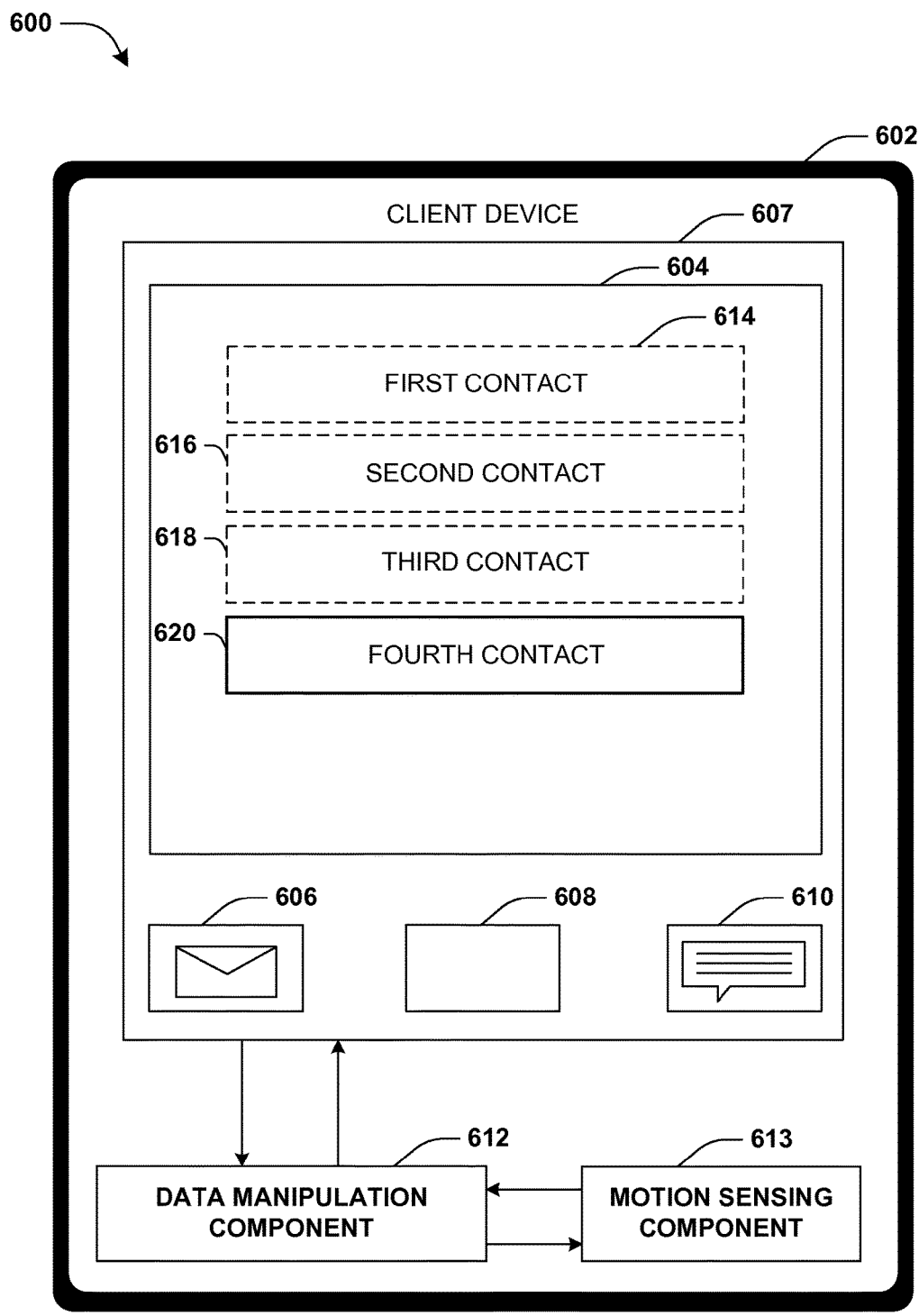
FIG. 6B is a component block diagram illustrating an example system for content navigation, where a termination of a touch signal is received and/or a rotation of a client device is ceased.

FIGS. 6A-6B illustrate an example of a system 600, comprising a data manipulation component 612, for visually traversing a set of data items utilizing a motion sensing component 613. A user may be presented with a graphical user interface 604, on a touch screen 607 of a client device 602, displaying the set of data items in a list format. In an example, the list format may comprise a first contact 614 listed before a second contact 616, the second contact 616 listed before a third contact 624, the third contact 624 listed before a fourth contact 622, etc.

The client device 602 may comprise a first icon 606, a touch icon 608, a second icon 610, etc. In an example, the user may touch 608A the touch icon 608 to send a touch signal, corresponding to a scroll initiation command, to the data manipulation component 612. The user may move the client device 602 in a first motion 618, which may be identified as sensor data by the motion sensing component 613. In an example, the first motion 618 may comprise an up to down motion (e.g., such as tilting the client device 602, shaking the client device 602, panning the client device 602 up or down, or any other motion and/or combination of motions). Responsive to identifying the first motion 618, a highlighting mechanism may move in a first direction 620 from the first contact 614 to the second contact 616. If the user continues the first motion 618, then the highlighting mechanism may move in the first direction 620 from the second contact 616 to the third contact 618, from the third contact 618 to the fourth contact 622, etc. In this way, the user may scroll through and/or highlight (e.g., bring into focus) the contacts by moving the client device 602.

FIG. 6B illustrates the user ceasing the motion, such as the first motion 618, of the client device 602. In an example, responsive to the user ceasing the motion of the client device 602 and/or terminating the touch signal (e.g., by ceasing the touch 608A of the touch icon 608), the data item (e.g., the fourth contact 620), in focus at a point in time when the user ceased the motion and/or ceased touching 608A the touch icon 608, may be brought into focus (e.g., selected, highlighted, etc.).

Figure 7A:
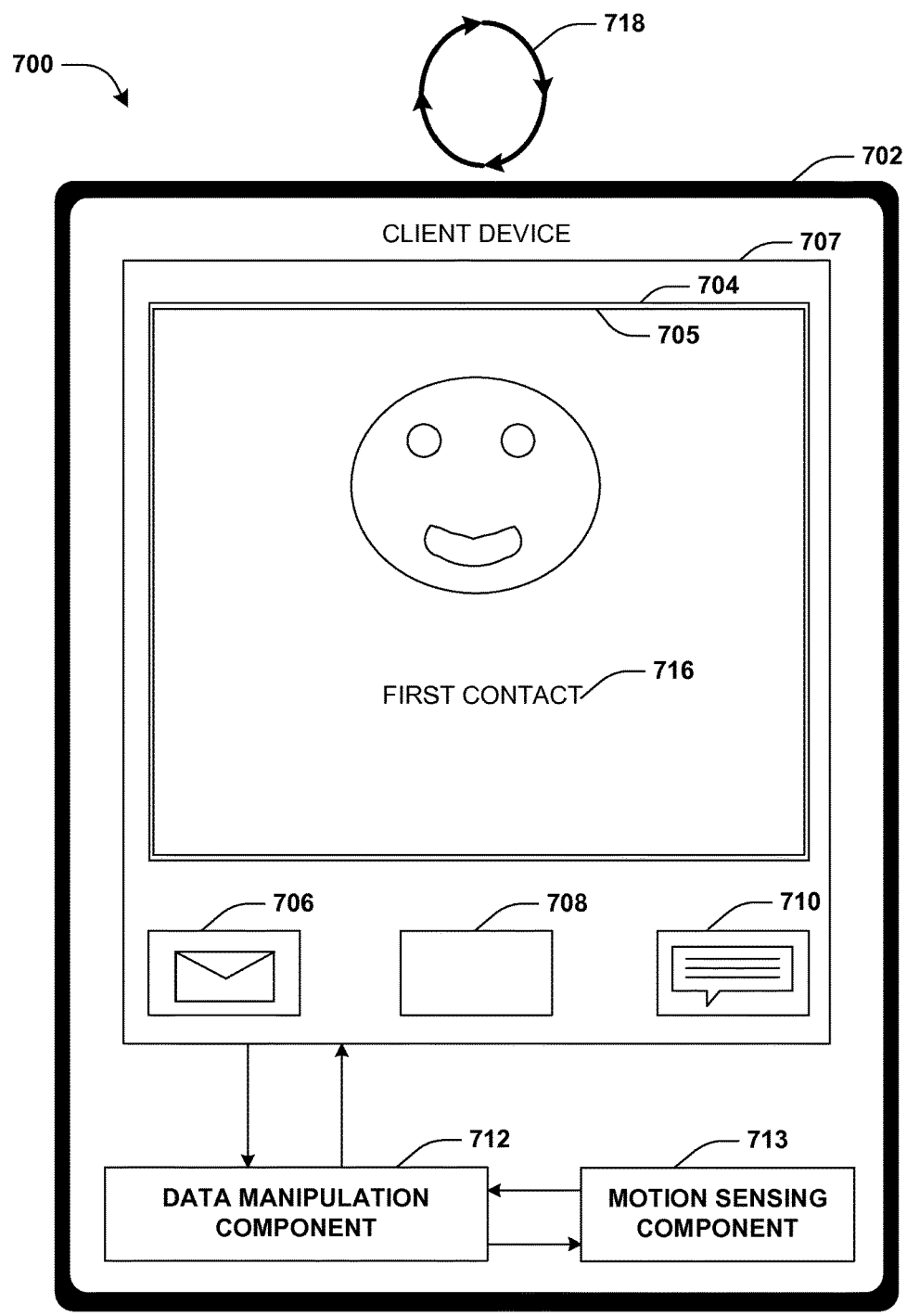
FIG. 7A is a component block diagram illustrating an example system for content navigation, where a set of data items are displayed according to a flash format.
Figure 7B:
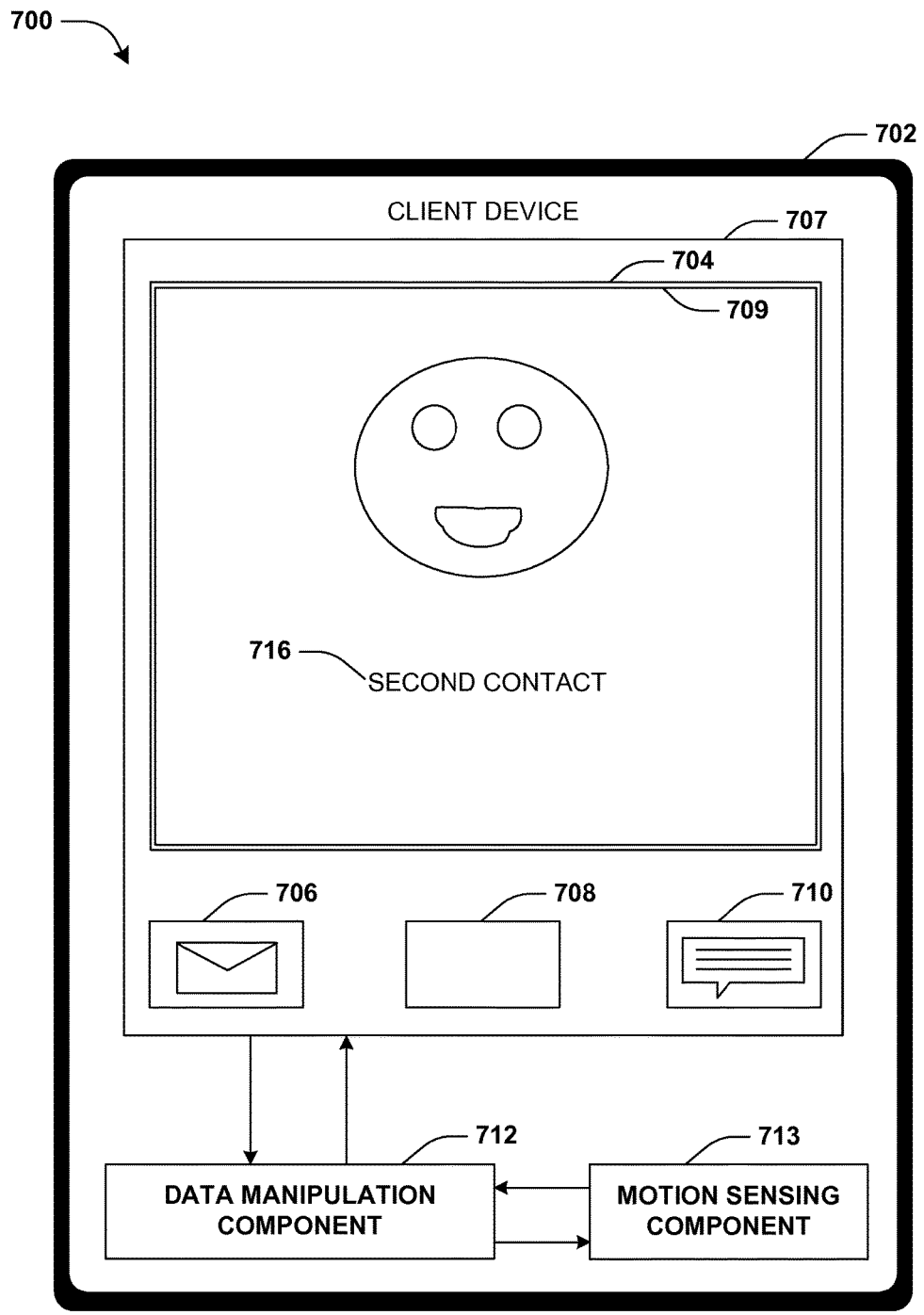
FIG. 7B is a component block diagram illustrating an example system for content navigation, where a rotation of a client device is ceased.

FIGS. 7A-7B illustrate an example of a system 700, comprising a data manipulation component 712, for visually traversing a set of data items utilizing a motion sensing component 713. A user may be presented with a graphical user interface 704, on a touch screen 707 of a client device 702, displaying the set of data items in a flash format, such as where a single data item may be displayed at any one point in time. In an example, a first data item may be displayed in a card format (e.g., a first contact 716 may be displayed on a first card 705, a second contact 716 may be displayed on a second card 709, etc.). The client device 702 may comprise a first icon 706, a touch icon 708, a second icon 710, etc. The user may move the client device 702 in a first motion 718, which may be identified as sensor data by the motion sensing component 713. In an example, the first motion 718 may comprise a circular motion in a clockwise or counter clockwise direction. Responsive to identifying the first motion 718, the touch screen 707 may flash from displaying the first contact 716 to displaying the second contact 716 (e.g., such that merely one card is visible to the user at a time).

FIG. 7B illustrates the user ceasing the motion, such as the first motion 718, of the client device 702. In an example, responsive to the user ceasing the motion of the client device 702, the data item (e.g., the second contact 716), in focus at a point in time when the user ceased the motion, may be brought into focus (e.g., selected, highlighted, etc.).

Figure 8:
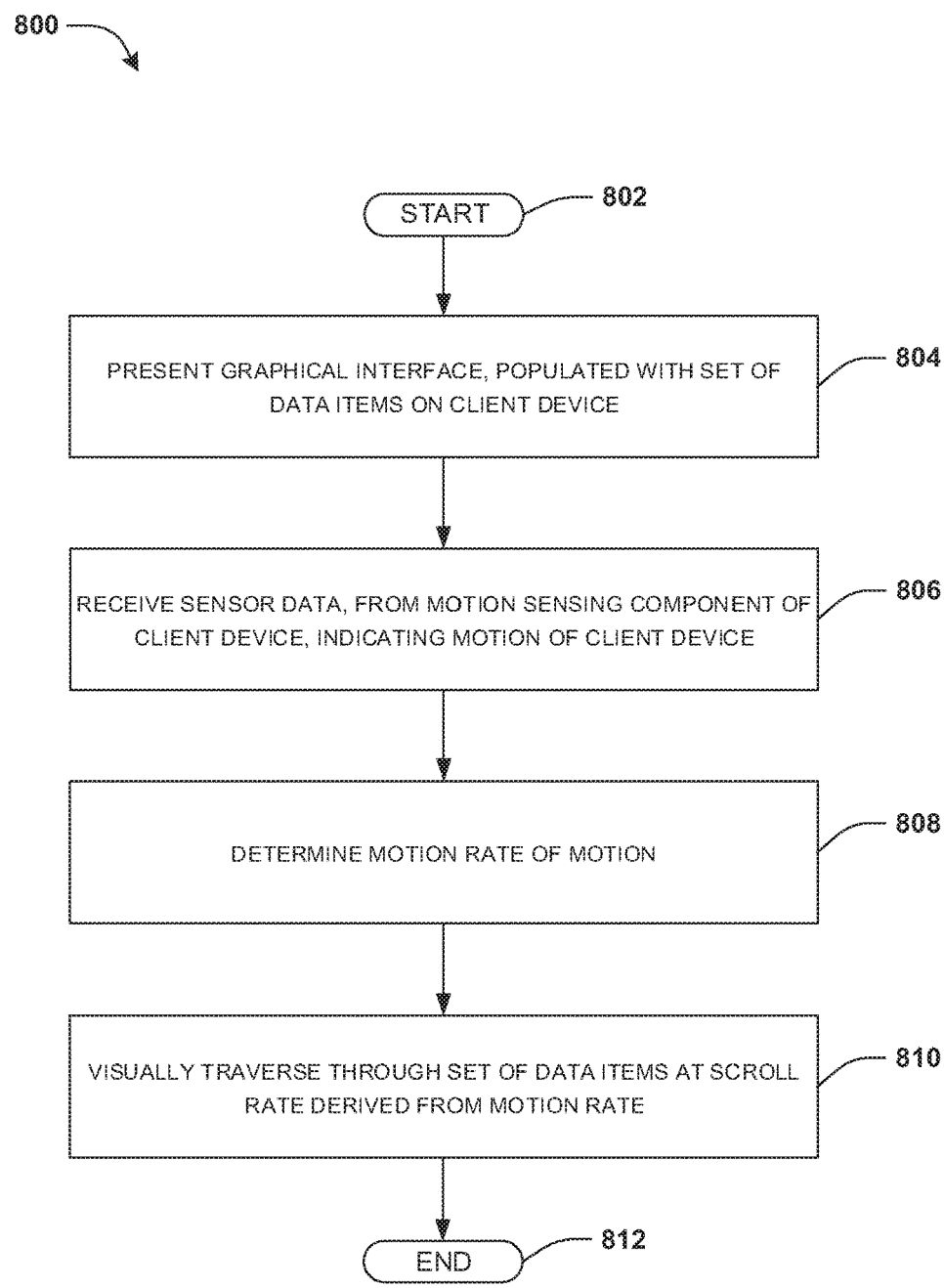
FIG. 8 is a flow chart illustrating an example method of content navigation.

An embodiment of content navigation is illustrated by an example method 800 of FIG. 8. At 802, the method 800 starts. At 804, a graphical user interface, populated with a set of data items on a client device (e.g., photos stored on the client device, social network posts of a social network website, music files within a folder, etc.), may be presented to the user. At 806, sensor data, from a motion sensing component of the client device, may be received. The sensor data may indicate that the client device is moving. At 808, a motion rate of the motion (e.g., a rotation rate of a rotation movement, a tilt angle or change in the tilt angle of a tile movement, a pan rate of a pan movement, etc.) may be determined. At 810, the set of data items may be visually traversed at a scroll rate derived from the motion rate (e.g., the photos may be scrolled through more quickly responsive to relatively faster motion rates). A direction of the scroll rate may be derived from a direction of the motion. At 812, the method 800 ends.

Figure 9:
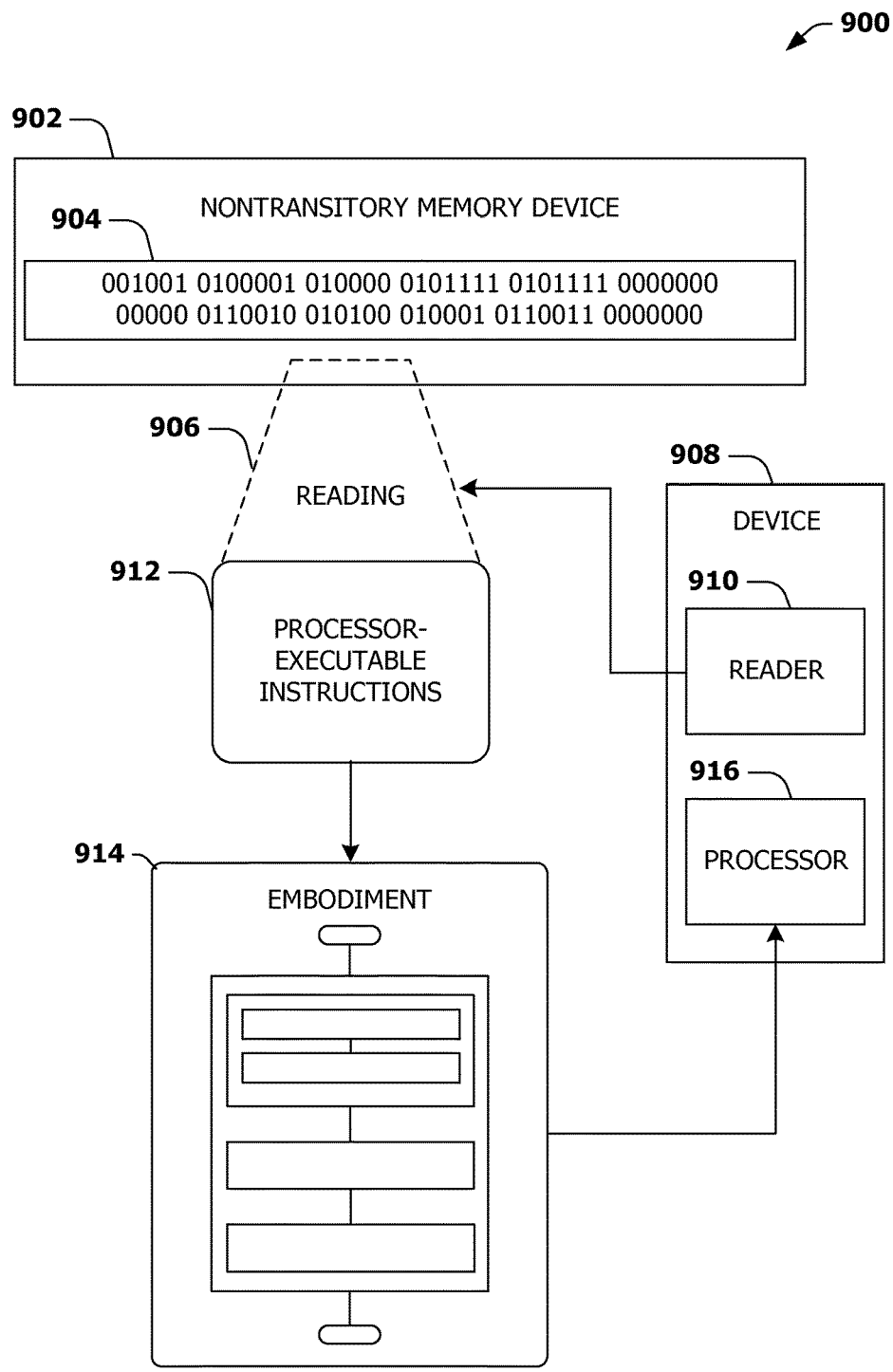
FIG. 9 is an illustration of a scenario featuring an example nontransitory memory device in accordance with one or more of the provisions set forth herein.

FIG. 9 is an illustration of a scenario 900 involving an example nontransitory memory device 902. The nontransitory memory device 902 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random dom access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 910 of a device 908 (e.g., a read head of a hard disk drive, or a read operation invoked on a solid-state storage device), express processor-executable instructions 912. In some embodiments, the processor-executable instructions, when executed on a processor 916 of the device 908, are configured to perform a method, such as at least some of the example method 800 of FIG. 8, for example. In some embodiments, the processor-executable instructions, when executed on the processor 916 of the device 908, are configured to implement a system, such as at least some of the example system 400 of FIGS. 4A-4D, at least some of the example system 500 of FIGS. 5A-5B, at least some of the example system 600 of FIGS. 6A-6B and/or at least some of the example system 700 of FIGS. 7A-7B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system of content navigation, comprising:
a processor; and
memory comprising processor-executable instructions that when executed by the processor implement a data manipulation component configured to:
present a graphical user interface, populated with a set of data items, to a user of a client device;
receive a touch signal, through a touch screen of the client device, corresponding to a touching of a touch icon in the graphical user interface;
receive sensor data, from a motion sensing component of the client device, indicating a motion of the client device;
determine a motion rate of the motion;
determine a scroll rate based upon the motion rate, wherein the determining the scroll rate comprises:
responsive to the motion rate exceeding a first threshold, determining that the scroll rate is a first scroll rate; and
responsive to the motion rate exceeding a second threshold, determining that the scroll rate is a second scroll rate, the first threshold different than the second threshold, the first scroll rate different than the second scroll rate;
responsive to determining that the touching of the touch icon is concurrent with the motion of the client device based upon the touch signal, visually traverse through the set of data items at the scroll rate;

determine a termination of the touch signal, through the touch screen, corresponding to a ceasing of the touching of the touch icon in the graphical user interface; and
responsive to the termination of the touch signal, (i) cease visually traversing through the set of data items and (ii) present a data item, from the set of data items, that is in focus at a time of the ceasing of the touching of the touch icon.

2. The system of claim 1, the data manipulation component further configured to:
responsive to the motion of the client device occurring according to a first motion, visually traverse through the set of data items in a first direction.

3. The system of claim 1, the data manipulation component further configured to:
responsive to the motion of the client device occurring according to a second motion, visually traverse through the set of data items in a second direction.

4. The system of claim 1, the data manipulation component further configured to:
visually traverse through the set of data items at the scroll rate based upon a determination that the touching of the touch icon occurred for a threshold amount of time.

5. The system of claim 1, the data manipulation component further configured to:
receive second sensor data, from the motion sensing component of the client device, indicating a second motion of the client device; and
responsive to determining that the touch icon is not touched concurrent with the second motion of the client device, refrain from visually traversing through the set of data items in association with the second motion.

6. The system of claim 1, the data manipulation component further configured to:
display no more than one data item at a point in time during visual traversal through the set of data items.

7. The system of claim 1, the sensor data received at a first time, the data manipulation component further configured to:
receive second sensor data, from the motion sensing component of the client device, indicating a second motion of the client device, the second sensor data received at a second time after the first time;
determine a second motion rate of the second motion;
determine a third scroll rate based upon the second motion rate, the third scroll rate different than the scroll rate; and
visually traverse through the set of data items at the third scroll rate.

8. The system of claim 1, the data manipulation component further configured to:
display the set of data items according to at least one of a carousel format, a list format, a flash format, or a card format.

9. The system of claim 1, the data manipulation component further configured to:
determine whether the motion rate exceeds a threshold;
responsive to the motion rate exceeding the threshold, visually traverse through the set of data items at the scroll rate; and
responsive to the motion rate not exceeding the threshold, refrain from visually traversing through the set of data items.

10. A method of content navigation, comprising:
presenting a graphical user interface, populated with a set of data items, to a user of a client device, the client device comprising a touch screen;
receiving a touch signal, through the touch screen of the client device, corresponding to a touching of a touch icon in the graphical user interface;
receiving sensor data, from a motion sensing component of the client device, indicating a motion of the client device;
determining a motion rate of the motion;
determining a scroll rate based upon the motion rate, wherein the determining the scroll rate comprises at least one of:
responsive to the motion rate exceeding a first threshold, determining that the scroll rate is a first scroll rate; or
responsive to the motion rate exceeding a second threshold, determining that the scroll rate is a second scroll rate, the first threshold different than the second threshold, the first scroll rate different than the second scroll rate;
responsive to determining that the touching of the touch icon is concurrent with the motion of the client device based upon the touch signal, visually traversing through the set of data items at the scroll rate;
determining a termination of the touch signal, through the touch screen, corresponding to a ceasing of the touching of the touch icon in the graphical user interface; and
responsive to the termination of the touch signal, at least one of (i) ceasing to visually traverse through the set of data items or (ii) presenting a data item, from the set of data items, that is in focus at a time of the ceasing of the touching of the touch icon.

11. The method of claim 10, further comprising:
visually traversing through the set of data items at the scroll rate based upon a determination that the touching of the touch icon occurred for a threshold amount of time.

12. The method of claim 10, further comprising:
receiving second sensor data, from the motion sensing component of the client device, indicating a second motion of the client device; and
responsive to determining that the touch icon is not touched concurrent with the second motion of the client device, refraining from visually traversing through the set of data items in association with the second motion.

13. The method of claim 10, further comprising:
responsive to the motion of the client device occurring according to a first motion, visually traversing through the set of data items in a first direction.

14. The method of claim 10, further comprising:
responsive to the motion of the client device occurring according to a second motion, visually traversing through the set of data items in a second direction.

15. The method of claim 10, further comprising:
determining the motion rate of the client device based upon sensing at least one of a rotation movement, a pan movement, a velocity, a change in velocity, a tilt angle, or a change in tilt angle of the client device.

16. The method of claim 10, further comprising:
displaying the set of data items according to at least one of a carousel format, a list format, a flash format, or a card format.

17. The method of claim 10, further comprising:
determining whether the motion rate exceeds a threshold;
responsive to the motion rate exceeding the threshold, visually traversing through the set of data items at the scroll rate; and
responsive to the motion rate not exceeding the threshold, refraining from visually traversing through the set of data items.

18. A system of content navigation, comprising:
a processor; and
memory comprising processor-executable instructions that when executed by the processor implement a data manipulation component configured to:
- present a graphical user interface, populated with a set of data items, to a user of a client device;
- receive a touch signal, through a touch screen of the client device, corresponding to a touching of a touch icon in the graphical user interface, the touch signal associated with a scroll initiation command;
- receive sensor data, from a motion sensing component of the client device, indicating a motion of the client device;
- determine a motion rate and a motion direction of the motion;
- determine a scroll rate based upon the motion rate, wherein the determining the scroll rate comprises:
  - responsive to the motion rate exceeding a first threshold, determining that the scroll rate is a first scroll rate; and
  - responsive to the motion rate exceeding a second threshold, determining that the scroll rate is a second scroll rate, the first threshold different than the second threshold, the first scroll rate different than the second scroll rate;
- determine a scroll direction based upon the motion direction; and
- responsive to receiving the touch signal, visually traverse through the set of data items at the scroll rate in the scroll direction based upon the scroll initiation command.

19. The system of claim 18, the data manipulation component further configured to:
responsive to receiving a termination of the touch signal, cease visually traversing through the set of data items; and
present a data item, from the set of data items, that is in focus at a point in time when the touch signal was terminated.

20. The system of claim 18, the sensor data received at a first time, the data manipulation component further configured to:
receive second sensor data, from the motion sensing component of the client device, indicating a second motion of the client device, the second sensor data received at a second time after the first time;
determine a second motion rate of the second motion;
determine a third scroll rate based upon the second motion rate, the third scroll rate different than the scroll rate; and
visually traverse through the set of data items at the third scroll rate.

* * * * *